United States Patent
Salgado

(10) Patent No.: US 9,678,697 B2
(45) Date of Patent: Jun. 13, 2017

(54) SYSTEMS AND METHODS OF DISPLAYING A PRINTER DRIVER USER INTERFACE

(71) Applicant: XEROX CORPORATION, Norwalk, CT (US)

(72) Inventor: David L. Salgado, Victor, NY (US)

(73) Assignee: XEROX CORPORATION, Norwalk, CT (US)

( * ) Notice: Subject to any disclaimer, the term of this patent is extended or adjusted under 35 U.S.C. 154(b) by 244 days.

(21) Appl. No.: 13/780,949

(22) Filed: Feb. 28, 2013

(65) Prior Publication Data

US 2014/0240740 A1    Aug. 28, 2014

(51) Int. Cl.
G06F 3/12 (2006.01)

(52) U.S. Cl.
CPC .......... *G06F 3/1256* (2013.01); *G06F 3/1208* (2013.01); *G06F 3/1285* (2013.01)

(58) Field of Classification Search
None
See application file for complete search history.

(56) References Cited

U.S. PATENT DOCUMENTS

| | | | |
|---|---|---|---|
| 6,134,019 A | 10/2000 | Wantuck, Jr. et al. | |
| 6,683,597 B1 * | 1/2004 | Tsung-hsun | G06F 1/1601 345/156 |
| 6,814,510 B1 | 11/2004 | Sabbagh et al. | |
| 6,967,734 B1 | 11/2005 | Wang et al. | |
| 7,187,461 B2 | 3/2007 | Schlonski et al. | |
| 7,280,241 B2 | 10/2007 | Dabney et al. | |
| 2003/0147097 A1 * | 8/2003 | Kotani et al. | 358/1.18 |
| 2004/0003351 A1 * | 1/2004 | Sommerer et al. | 715/517 |
| 2004/0263426 A1 * | 12/2004 | Endo | 345/2.2 |
| 2005/0078974 A1 * | 4/2005 | Uchida et al. | 399/81 |
| 2006/0109497 A1 * | 5/2006 | Ferlitsch et al. | 358/1.15 |
| 2007/0030524 A1 * | 2/2007 | Murakoshi | G06F 17/30126 358/403 |
| 2007/0240042 A1 * | 10/2007 | Sato | 715/527 |
| 2007/0242303 A1 | 10/2007 | Barry et al. | |
| 2008/0231914 A1 * | 9/2008 | Motoyoshi | 358/474 |
| 2008/0246993 A1 | 10/2008 | Murakami et al. | |
| 2008/0297812 A1 * | 12/2008 | Watanabe | H04N 1/00411 358/1.9 |
| 2011/0075207 A1 | 3/2011 | Nakata | |
| 2011/0217107 A1 | 9/2011 | Usui | |
| 2012/0140278 A1 * | 6/2012 | Sousa et al. | 358/1.15 |
| 2013/0038627 A1 * | 2/2013 | Mujkic et al. | 345/619 |
| 2013/0094056 A1 | 4/2013 | Kobayashi | |

* cited by examiner

*Primary Examiner* — Ming Hon
(74) *Attorney, Agent, or Firm* — MH2 Technology Law Group LLP

(57) ABSTRACT

An embodiment is a method of presenting options for printing a document. A computing system receives data descriptive of a document to be printed. The computing system identifies one or more preview thumbnail profiles indicative of graphical parameters for rendering a portion of the document to be printed into preview thumbnail images. The computing system renders a portion of the document to be printed, based at least in part on the graphical parameters of the one or more preview thumbnail profiles, to generate one or more preview thumbnail images. The computing system displays the one or more preview thumbnail images on a printer driver user interface in conjunction with one or more printing options. The preview thumbnail images display predicted appearances of the portion of the document corresponding to the printing options.

20 Claims, 9 Drawing Sheets

SYSTEMS AND METHODS OF DISPLAYING A PRINTER DRIVER USER INTERFACE

TECHNICAL FIELD

The subject matter of this disclosure relates to printer drivers. More particularly, the subject matter of this disclosure relates to presentation of printer driver user interfaces.

BACKGROUND

An important function of home and business computers today is printing electronic documents to hard copies. Numerous technologies exist for rendering digital files onto paper, such as inkjet and laser printers. Indeed, even three-dimensional printing is emerging and becoming available to consumers.

These printing systems often provide numerous options for controlling their operation. Among other things, printers can be configured to adjust colors, to convert color documents to black and white, to print at various resolutions, to add watermarks to documents, and so on. A user of a printing system may select these options through a user interface operated by software on the user's computer, through a built-in control panel on the printing device, through a network protocol such as SNMP, and in various other ways. Printer driver interfaces are the subject of U.S. Pat. Nos. 7,280,241, 6,134,019, 7,187,461, 6,967,734, all of which are commonly assigned with the present application to Xerox Corporation and are incorporated in their entirety herein by reference.

Due to the proliferation of printing options, a user may have difficulty understanding all of the options and identifying the ones desired. In particular, the user may not find it easy to visualize the cumulative effects of a combination of the selected options and how that combination of options will appear when printed. The user may resort to printing a document out solely to determine whether the printing options require adjustment. Such an option is wasteful of paper and printing supplies, and is thus undesirable.

SUMMARY

Accordingly, disclosed in various embodiments are systems and methods of presenting a user interface relating to printing options. An embodiment is a method of presenting options for printing a document. The method is performed on a computing system comprising a computer processor and non-transitory storage. The computing system receives data descriptive of a document to be printed. The computing system identifies one or more preview thumbnail profiles indicative of graphical parameters for rendering a portion of the document to be printed into preview thumbnail images. The computing system renders a portion of the document to be printed, based at least in part on the graphical parameters of the one or more preview thumbnail profiles, to generate one or more preview thumbnail images. The computing system displays the one or more preview thumbnail images on a printer driver user interface in conjunction with one or more printing options. The preview thumbnail images display predicted appearances of the portion of the document corresponding to the printing options.

Optionally in any of the aforementioned embodiments, the method also includes transmitting data to a printer, directing the printer to print the document to be printed. The transmitted data indicates user selections of the one or more printing options.

Optionally in any of the aforementioned embodiments, the method also includes additional elements. The computing system receives, from a user, a selection of settings for one of the printing options. The computing system regenerates at least one of the preview thumbnail images based on the selection of settings. The regenerated preview thumbnail images incorporate the selection of settings.

Optionally in any of the aforementioned embodiments, the method also includes determining whether to display preview thumbnail images or stock thumbnail images on the printer driver user interface. The portion of the document to be printed is rendered to generate the one or more preview thumbnail images in response to a determination to display preview thumbnail images rather than stock thumbnail images.

Optionally in any of the aforementioned embodiments, the method also includes additional elements. The computing system receives, on the printer driver user interface, an indication of interest in a portion of the user interface. The computing system identifies a detailed preview thumbnail image corresponding to the portion of the user interface in which interest was indicated. The computing system displays the detailed preview thumbnail image on the user interface.

Optionally in any of the aforementioned embodiments, the indication of interest comprises hovering a mouse cursor over the portion of the user interface.

Optionally in any of the aforementioned embodiments, the detailed preview thumbnail image comprises a larger version of one of the preview thumbnail images being displayed on the user interface.

Optionally in any of the aforementioned embodiments, the user interface is configured to display two or more preview thumbnail images simultaneously. A user may compare the appearance of the two or more preview thumbnail images to facilitate in selecting among the printing options.

Optionally in any of the aforementioned embodiments, the computing system is a multifunction device. The user interface comprises a display and one or more buttons on the multifunction device.

An embodiment is a computer system. The system includes one or more computer processors configured to execute software modules stored in memory. The system includes a non-transitory memory having stored therein a plurality of software modules. The system includes a document receipt module stored in the memory configured to receive data descriptive of a document to be printed. The system includes a rendering module stored in the memory configured to render a portion of the document to be printed, to generate one or more preview thumbnail images. The system includes a display module stored in the memory configured to display the one or more preview thumbnail images on a printer driver user interface in conjunction with one or more printing options.

Optionally in any of the aforementioned embodiments, the system also includes a transmission module stored in the memory configured to transmit data to a printer. The data directs the printer to print the document to be printed. The transmitted data indicates user selections of the one or more printing options.

Optionally in any of the aforementioned embodiments, the system also includes additional elements. The system includes a settings receipt module stored in the memory configured to receive, from a user, a selection of settings for one of the printing options. The system includes a regeneration module stored in the memory configured to regenerate at least one of the preview thumbnail images based on the selection of settings. The regenerated preview thumbnail images incorporate the selection of settings.

Optionally in any of the aforementioned embodiments, the system also includes a stock image use module configured to determine whether to display preview thumbnail images or stock thumbnail images on the printer driver user interface. The portion of the document to be printed is rendered to generate the one or more preview thumbnail images in response to a determination to display preview thumbnail images rather than stock thumbnail images.

Optionally in any of the aforementioned embodiments, the system also includes additional elements. The system includes an interest indication module configured to receive, on the printer driver user interface, an indication of interest in a portion of the user interface. The system includes an identification module configured to identify a detailed preview thumbnail image corresponding to the portion of the user interface in which interest was indicated. The system includes a detailed display module configured to display the detailed preview thumbnail image on the user interface.

Optionally in any of the aforementioned embodiments, the indication of interest comprises hovering a mouse cursor over the portion of the user interface.

Optionally in any of the aforementioned embodiments, the detailed preview thumbnail image comprises a larger version of one of the preview thumbnail images being displayed on the user interface.

Optionally in any of the aforementioned embodiments, the user interface is configured to display two or more preview thumbnail images simultaneously.

Optionally in any of the aforementioned embodiments, the computing system is a multifunction device. The user interface comprises a display and one or more buttons on the multifunction device.

An embodiment is a non-transitory computer-readable medium having stored thereon a plurality of instructions configured to be executed on a computer system comprising a computer processor. The instructions include a document receipt module configured to receive data descriptive of a document to be printed. The instructions include a rendering module configured to render a portion of the document to be printed, to generate one or more preview thumbnail images. The instructions include a display module configured to display the one or more preview thumbnail images on a printer driver user interface in conjunction with one or more printing options.

Optionally in any of the aforementioned embodiments, the plurality of instructions further comprise an interest indication module configured to receive, on the printer driver user interface, an indication of interest in a portion of the user interface. The computing system an identification module configured to identify a detailed preview thumbnail image corresponding to the portion of the user interface in which interest was indicated. The computing system a detailed display module configured to display the detailed preview thumbnail image on the user interface.

DESCRIPTION OF THE EMBODIMENTS

For simplicity and illustrative purposes, the principles of the present teachings are described by referring mainly to exemplary embodiments thereof. However, one of ordinary skill in the art would readily recognize that the same principles are equally applicable to, and can be implemented in, all types of printing systems, and that any such variations may be included in various embodiments. Moreover, in the following detailed description, references are made to the accompanying figures, which illustrate specific embodiments. Electrical, mechanical, logical and structural changes can be made to various embodiments. It will be understood that the embodiments disclosed may be varied, augmented, or altered, that elements may be exchanged with their equivalents, and that elements may be implemented in many different ways.

In one embodiment, a printer driver enables users to print copies of documents through a user interface that displays previews of the document as it would be printed with various printing options selected. Original copies of documents can include electronic copies stored in a computer-readable storage medium, hardcopies fixed in a tangible medium, and the like.

In an embodiment, a printer driver operates on a computer or computing device, and displays a user interface presenting various printing options. Many printing options may be included, such as color correction, brightness, contrast, black-and-white conversion, grayscale conversion, application of watermarks, application of headers/footers, page size scaling, page rotation, print resolution, duplexing, paper type, and so on. The printer driver may generate one or more preview thumbnails based on the document to be printed, and those thumbnails may be included on the user interface to demonstrate the predicted appearance of the document that would be printed with certain options selected. Inclusion of these thumbnails may advantageously improve the user's understanding of the various options and enable the user to make informed selections about those options. The disclosure herein presents various embodiments in which such thumbnails may be used and/or displayed.

Some of the embodiments are described below with respect to a printer driver operating on a user's computer. However, it will be understood that the described technology may be applied in other environments as well. For example, the user interfaces described herein may be presented on a printing device, such as a business printer, photocopy machine, multifunction device, and the like. Furthermore, although embodiments below are described with respect to printing of digital documents to paper, it will be understood that those embodiments may be adapted to other environments, such as 3D printing, CNC machining, medical imaging, and so on.

Figure 1A:
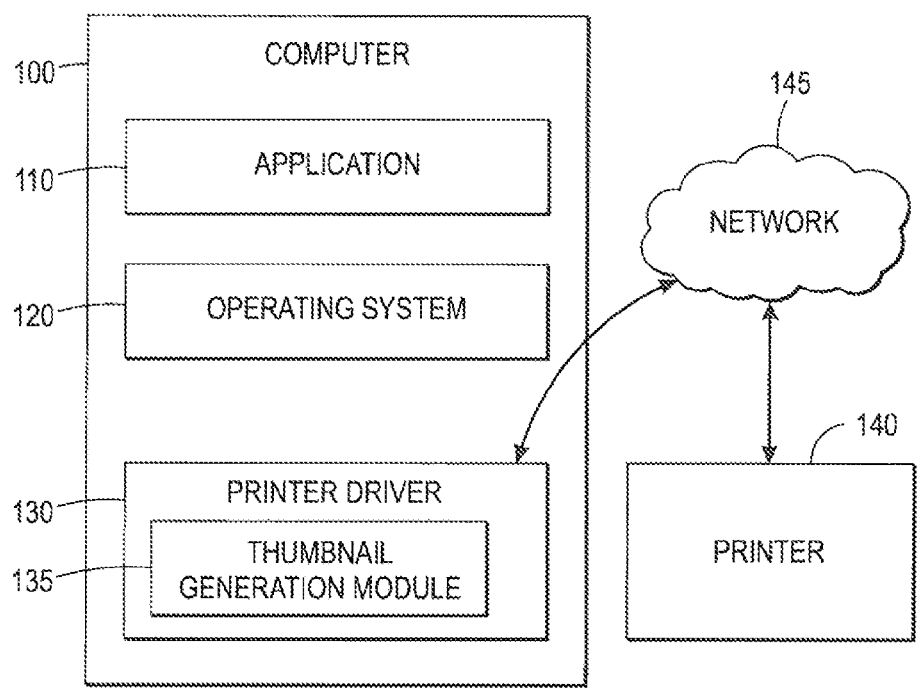
FIG. 1A is a block diagram of an embodiment of a printing system.

FIG. 1A is a block diagram of an embodiment of a printing system. In various embodiments, additional blocks may be included, some blocks may be removed, and/or blocks may be connected or arranged differently from what is shown.

In the embodiment of FIG. 1A, the printing system can include a computer 100. Software installed on computer 100 can include one or more applications 110, an operating system ("OS") 120, and a printer driver 130. Applications 110 can include computer applications, applets, firmware, and other computer programs for manipulating text, graphics, and display data. Applications 110 are managed by OS 120, and can create and edit documents and generate print jobs to print the documents. OS 120 can be any commercial, open-source, or proprietary operating system or platform.

Printer driver 130 can be a device driver that converts a print job generated by applications 110 into print commands in a format that can be interpreted by a printer 140, such as a printer control language, a page description language, a page description markup language, a bitmap, and the like.

In various embodiments 100 can be implemented as any type of computer system, such as a server computer, a desktop computer, a virtual machine, a laptop, a mobile device, a tablet computer, a smartphones, a personal digital assistant, and the like. Computer 100 can include components of a conventional computer system, embodiments of which are described in greater detail below. In various embodiments, computer 100 in the printing system can be configured to communicate with printer 140 and/or other printers or computer systems. As illustrated in FIG. 1A, for example, printer driver 130 can be implemented to run on computer 100, which is communicatively coupled to printer 140 via a network 145. Network 145 can include one or more communication networks, such as a local area network, a wide area network, a cellular network, the Internet, a cloud-based network, and the like, or any combination thereof. Printer driver 130 can also communicate and/or interact with a user via network 145. For instance, printer driver 130 can provide one or more user interfaces to communicate with the user via a network 145, which can include a print dialogue, a web page, a web portal, an electronic mail application, a messaging application, a media player, and other types of network-based interfaces known to one skilled in the art. As such, the user can utilize printer driver 130 running on computer 100 to send print jobs via network 145 to printer 140.

Printer driver 130 may include thumbnail generation module 135. The thumbnail generation module may be implemented in executable software code or in computer hardware, and perform processes and algorithms of generating preview thumbnail images, embodiments of which are described below.

Figure 1B:
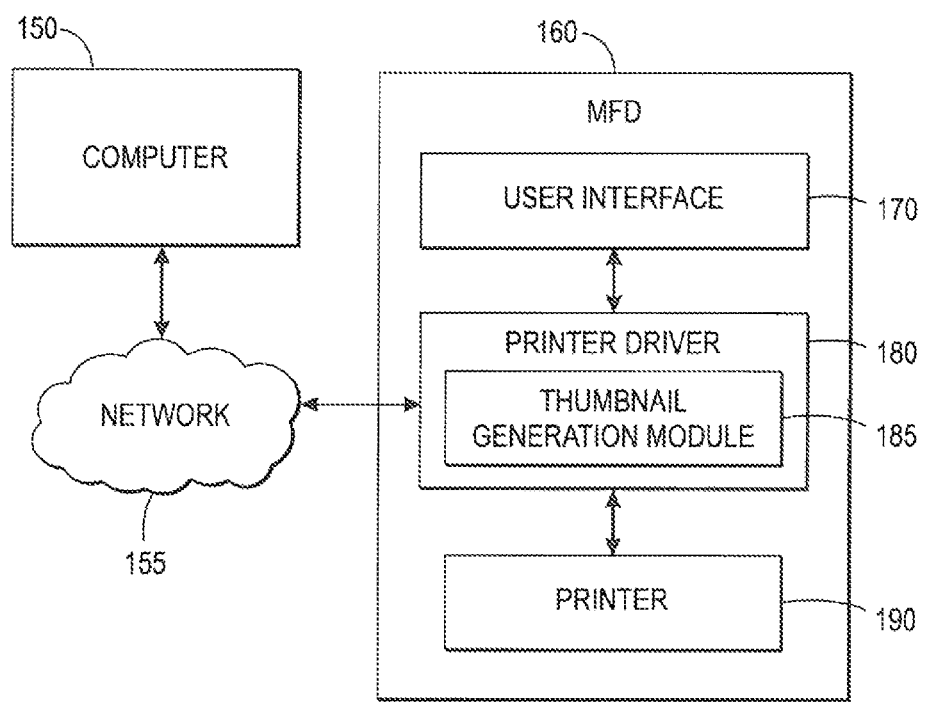
FIG. 1B is a block diagram of a multifunction device, as used in an embodiment.

FIG. 1B is a block diagram of a multifunction device ("MFD") 160, as used in an embodiment. In various embodiments, additional blocks may be included, some blocks may be removed, and/or blocks may be connected or arranged differently from what is shown.

MFD 160 can include a printer 190, a scanning mechanism (not shown), a fax interface (not shown), etc., and can operate as a printer, scanner, fax machine, copier, and/or other items. Such a device may include a user interface 170, composed of a display and/or input elements. The input elements may include buttons, dials, a touch screen, and the like. MFD 160 can communicate with a computer 150 via a network 155, which can include one or more communication networks, such as a local area network, a near-field communication link or network, a wide area network, a cellular network, the Internet, a cloud-based network, and the like, or any combination thereof.

MFD 160 can receive print data descriptive of a document from a component of MFD 160 or computer 150, for example, when a user utilizes MFD 160 to make a copy by scanning a hardcopy of the document or when MFD 160 receives a facsimile of the document from a remote device (e.g., a fax machine or server). This process may include presenting print options via user interface 170. Additionally or alternatively, the options may be presented via a network connection, for example on computer 150. Thumbnail generation module 185 may be part of printer driver 180, and it may generate thumbnail images to be displayed on user interface 170 or elsewhere. Printer driver 180 can utilize thumbnail generation module 185 to generate one or more preview thumbnail images based on the print data, convert the print data into print commands, and output the print commands to printer 190 or another output device (e.g., a remote fax machine or server) to generate a printed copy of the document.

Figure 2:
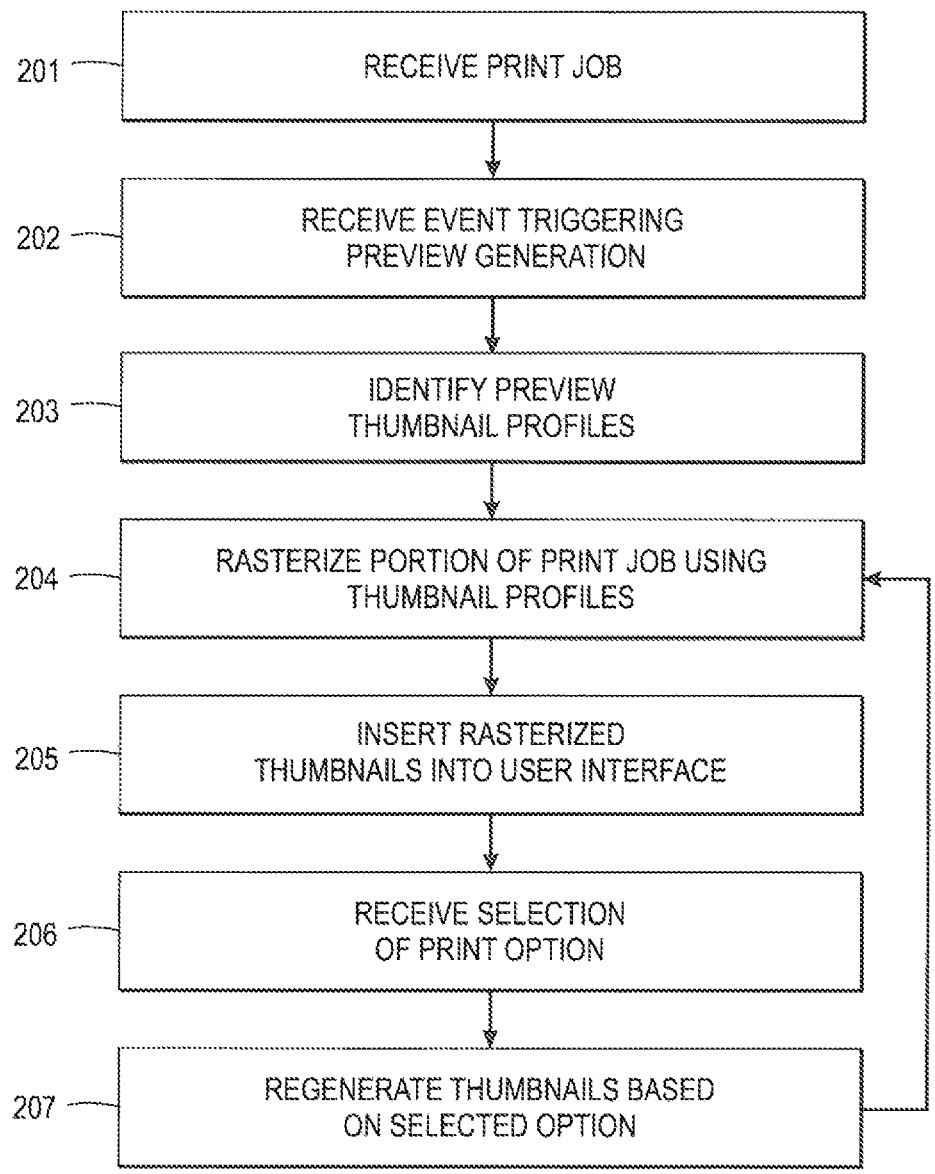
FIG. 2 is a flowchart of a process of presenting preview thumbnails on a user interface, as used in an embodiment.

FIG. 2 is a flowchart of a process of presenting preview thumbnails on a user interface, as used in an embodiment. The process of FIG. 2 may be performed during the operation of a printer driver on a user computer or multifunction device, in an embodiment. In various embodiments, additional blocks may be included, some blocks may be removed, and/or blocks may be connected or arranged differently from what is shown.

At block 201, the printer driver receives a print job. The print job may be received from a user computer, scanning device, network communication, or other source. The printer driver may immediately process the received print job, or it may queue it for later processing.

At block 202, an event triggering the generation of preview thumbnails is received or otherwise identified by the printer driver. Different events may trigger generation of preview thumbnails, in various embodiments. The receipt of the print job at block 201 may itself be the triggering event, in which case preview thumbnails are generated immediately. Thus, block 202 is optional in some embodiments.

In some embodiments, the user interface displayed by the printer driver includes several tabs, and the triggering event of block 202 is the user's selection of an appropriate tab, such as the tab on which the preview thumbnails are to be placed. Other user interactions may trigger the generation of preview thumbnails, such as hovering a mouse over a particular element of the user interface, clicking on a portion of the user interface, touching a portion of the user interface via a touch screen, and so on.

At block 203, the printer driver may identify one or more thumbnail profiles to be used in generating the thumbnails. The thumbnail profiles may include data and/or instructions for rendering the document under various conditions associated with print options, so as to produce a predictive image indicating the appearance of the printed document with certain options selected. For example, a printer driver may offer an option for three levels of brightness for printing, and so the printer driver may identify three corresponding thumbnail profiles for generating a dark thumbnail, a medium thumbnail, and a light thumbnail, possibly among other profiles. Information associated with thumbnail profiles may include, for example, the size of the thumbnail to generate, color transformations for rendering the thumbnail, content to add to or remove from the thumbnail image, geometric transformations to apply to the thumbnail image, and the like. The thumbnail profiles may be coded into the printer driver, provided by the printer, selected by a user, dynamically generated based on user interface settings, and/or determined by other means.

At block 204, the printer driver may rasterize part or all of the print job using the thumbnail profiles identified in block 203. Rasterization is the process of converting an appropriate portion of the document to be printed into an image or other data suited for display or other presentation on the printer driver's user interface. In an embodiment, the rasterization includes generating a bitmap of a selected page of the document to be printed. In order to increase the responsiveness of the user interface, the rasterization process may include various shortcuts for rendering the document, such as greeking text, downsampling images, and the like. In an embodiment, each thumbnail is rendered based on the original document and the appropriate thumbnail data. In another embodiment, a single baseline thumbnail image is rendered based on the original document, and that baseline thumbnail is transformed according to the various thumbnail profiles, for example using soft proofing algorithms, to generate the individual thumbnails.

The rasterization process for a thumbnail may be based at least in part on the parameters of the thumbnail profile corresponding to the thumbnail being generated. Furthermore, the settings and parameters of the print device may be used in rendering the thumbnail so that it more closely predicts the output to be expected from the printer. The process may further consider settings of the user's computer or other display on which the thumbnails will be presented, such as color profile settings for the user's monitor, to increase fidelity between the predictive thumbnail and the printed output.

Part of the process of block 204 may include selecting a portion of the document to include in the thumbnail. In an embodiment, the first page of the document is used for thumbnails. The printer driver may be configured to enable the user to select a different page for the thumbnail, for example by including a page selector element on the user interface allowing the user to scroll through or otherwise choose the page to be used for the thumbnails. In an embodiment, a closeup view of a portion of a page may be rendered as thumbnails, for example to display the effect of different resolution settings. Additionally or alternatively, the thumbnails may include a composite of multiple pages of the document, for example arranged in an array. The thumbnails may all display the same portion of the document, or different thumbnails may display different portions, perhaps based on settings in the thumbnail profiles.

At block 205, the rasterized thumbnails from block 204 may be inserted into the printer driver's user interface or into another location. Thus, the user interface may now include preview thumbnails that indicate, to the user, how the printed document will appear if certain options are selected.

In various embodiments, the generated thumbnails may or may not change once they have been displayed on the user interface. In one embodiment, the thumbnails are updated in response to the user making one or more selections of print options. For example, a printer driver's user interface may display preview thumbnails for various levels of brightness, and the user interface may also provide an option for printing in color or grayscale. If the user chooses between the color and grayscale options, then the brightness level thumbnails may switch between being rendered in color and being rendered in grayscale respectively, in an embodiment.

An optional process for this thumbnail updating embodiment is described with respect to blocks 206 and 207.

At block 206, the printer driver may receive an indication of a selection of a print option. The print option may be selected by a user interacting with one or more elements of the printer driver's user interface. The selected print option may originate from the printer as well: for example, the printer may indicate that it is out of color ink, so that the printer driver can update its user interface accordingly.

At block 207, the printer driver regenerates some or all of the thumbnails in response to the print option selected in block 206. In an embodiment, the regeneration process of block 207 is the same as the rasterization process of block 204, but incorporating the selected print option. In an alternate embodiment, the thumbnails are regenerated by applying transformations and/or filters to the existing thumbnails rather than rasterizing the document. For example, if the user selects a print option for increasing brightness, then the thumbnails can be regenerated by adjusting the colors of the thumbnails already being displayed.

Using the displayed user interface, the user may make selections among the various printing options, so that the printer driver may direct a printer to print the document using the selected options.

In an embodiment, the regeneration at block 207 applies only to the thumbnails for options different from the option selected at block 206. For example, if a brightness option is selected at block 206, then the thumbnails relating to brightness options would not be regenerated at block 207, while thumbnails relating to other options would be regenerated. Displaying multiple thumbnails for possible settings of a particular print option (e.g., thumbnails for several brightness levels) is advantageous in some embodiments, because it enables the user to easily compare the effect of the different settings at a glance.

Figure 3:
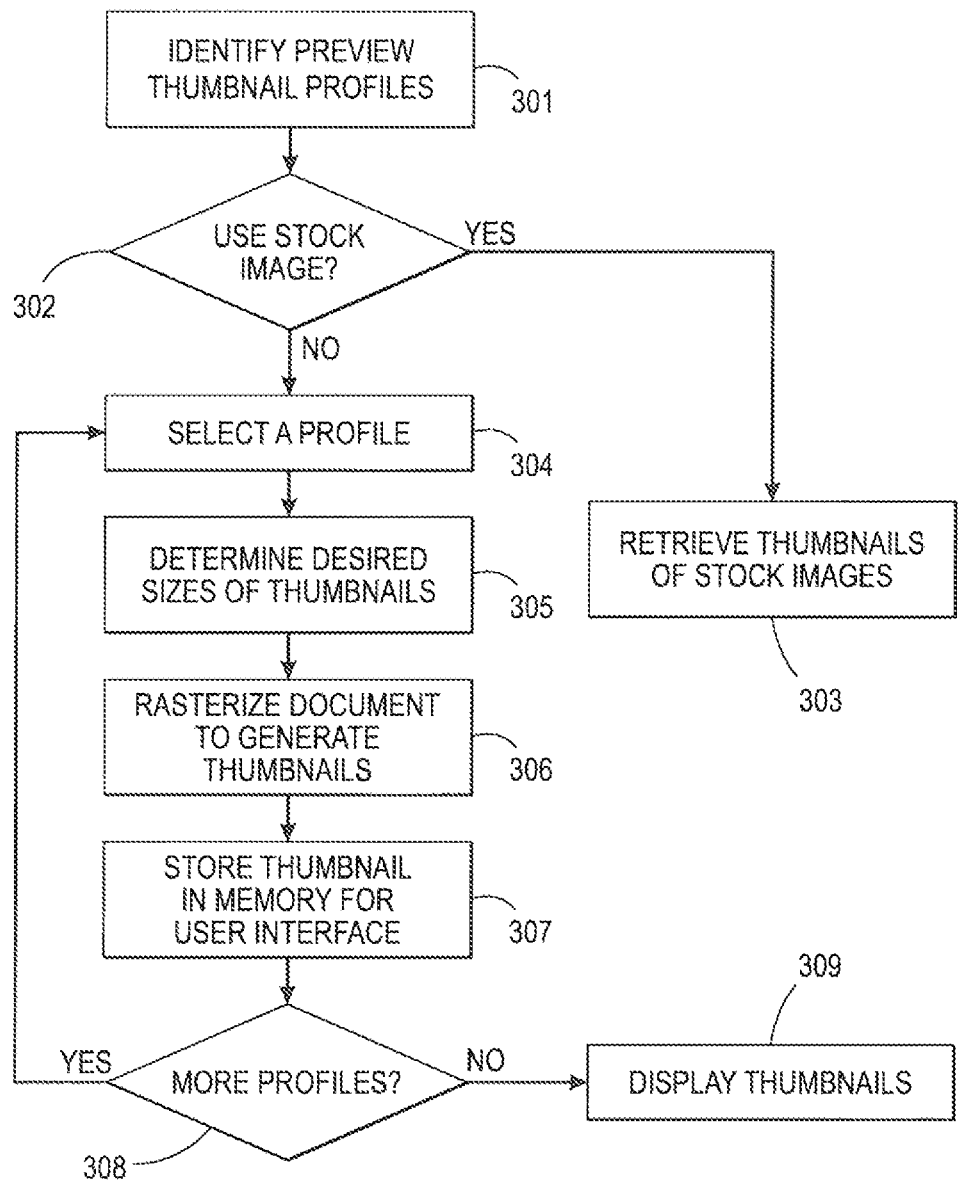
FIG. 3 is a flowchart of a process of rendering preview thumbnails, as used in an embodiment.

FIG. 3 is a flowchart of a process of rendering preview thumbnails, as used in an embodiment. The process may be performed, for example, by a printer driver or other software operating on a user computer or multifunction device, and it may be performed at blocks 203-205 of FIG. 2. In various embodiments, additional blocks may be included, some blocks may be removed, and/or blocks may be connected or arranged differently from what is shown.

At block 301, the printer driver identifies one or more preview thumbnail profiles to be used for generating preview thumbnails. At block 302, the printer driver determines whether to use a stock image for the thumbnails or to render the thumbnails based on the actual document to be printed. A stock image may be, for example, a standard image displayed on the printer driver's user interface as an alternative to rendering thumbnails of the particular document to be printed. The determination of whether to use a stock image at block 302 may be based on a previous user selection, through the printer driver user interface or other means, of whether to use a stock image or generated preview thumbnails. Providing such an option may have the advantage of enabling the user to choose between a higher-performance, more responsive user interface, or a user interface that provides more accurate and useful information about the appearance of the document to be printed. Additionally or alternatively, the printer driver may include algorithms for automatically determining whether to use a stock image or generated thumbnails. In an embodiment, the printer driver makes this automatic determination based on an estimate or calculation of the amount of time or other resources that would be required to generate the thumbnails, so that a stock image may be used if the process of generating thumbnails would be too time-consuming or otherwise undesirable.

If, at block 302, the printer driver determines that a stock image is to be used, then at block 303 the printer driver retrieves the stock images to be used as the preview thumbnails. The stock image may be stored as a default image with the printer driver, it may be retrieved from the user's computer, it may be preselected by the user, and/or it may be obtained in other ways. In an embodiment, multiple stock images are used, for example to demonstrate different features of the printer and/or printer driver.

In an embodiment, the stock image has been previously rendered in accordance with the thumbnail profiles of block 301, so at block 303 the printer driver can retrieve and use those pre-rendered thumbnails. Alternately, at block 303 the printer driver may use a single stock image and render that stock image according to the thumbnail profiles of block 301. The process of rendering the stock image into preview thumbnails may be analogous to the process of rendering a portion of the document to be printed, as described with respect to blocks 305-307 and elsewhere in this specification. After rendering the stock image thumbnails, the rendered thumbnails may optionally be cached for future use.

If the printer driver determines at block 302 not to use a stock image, then at block 304 the printer driver selects one of the profiles from block 301 to be processed. In an alternate embodiment, several or all of the thumbnail profiles may be processed simultaneously, for example through multithreaded processing.

At block 305, the printer driver determines the desired sizes of the thumbnails to be generated. The sizes may be determined based on values encoded in the printer driver, the thumbnail profile selected at block 304, the dimensions of the printer driver user interface, the available screen resolution and geometry, and/or other information. In an embodiment, the printer driver may identify multiple sizes of thumbnails to generate. This may be used on a user interface, for example, where a smaller thumbnail is displayed and then a larger thumbnail is displayed if the user hovers a mouse over the smaller thumbnail or takes other types of actions, described in greater detail below.

At block 306, the printer driver rasterizes an appropriate portion of the document to generate thumbnails based on the selected thumbnail profile from block 304 and the sizes from block 305, and/or based on other parameters. The rasterization process may include conversion of a page description language, such as PostScript, PCL, PDF, or other format, possibly including execution of an appropriate language interpreter. To improve speed of processing and other use of resources, simplifying procedures may be taken in the interpretation process, as explained previously, in some embodiments. The rasterization process may additionally or alternately include downsampling of bitmap or other images. The process may further include the application of transformations to the document or the rasterized image, such as color corrections, geometric transformations, and so on, as specified by the thumbnail profile being processed, the printer driver, user computer settings, printer settings, and/or other information. The particular portion of the document that is to be rasterized is selected based on processes described elsewhere in this specification, and as described previously, in some embodiments the portion may be selected based on user input and/or preferences. The result of the process of block 306 is one or more thumbnail images, which may be represented in a variety of data formats appropriate for display or other presentation.

At block 307, the one or more generated thumbnails are stored in memory for use by the user interface. The thumbnails may be displayed immediately on the printer driver's user interface, or they may be reserved for future display, for example if the portion of the user interface that would otherwise include the generated thumbnails is not currently visible (e.g., an unselected tab). In some embodiments, the generated thumbnails are cached in memory so that they need not be regenerated upon repeated display of the particular thumbnails, thus further increasing performance and responsiveness of the printer driver user interface. In an embodiment, at block 307 the generated thumbnail is alternately or additionally transmitted to an external device, for example via a network connection, which may be used in a situation where the printer driver user interface is displayed remotely (e.g., via a web interface).

At block 308, the printer driver proceeds to perform the processing of blocks 304-307 for the remaining thumbnail profiles of block 301. Once a sufficient set of thumbnails has been generated, the printer driver may proceed to block 309 to display or otherwise present the thumbnails. The presentation may be immediate, occurring once the generation of the thumbnails is complete. In an alternate embodiment, each thumbnail is presented once it is generated, rather than being presented after all the thumbnails have been generated (as suggested in FIG. 3). Additionally or alternatively, the thumbnails may be retained in memory and presented at a later time, for example when the user makes an appropriate selection on the printer driver user interface.

Figure 4:
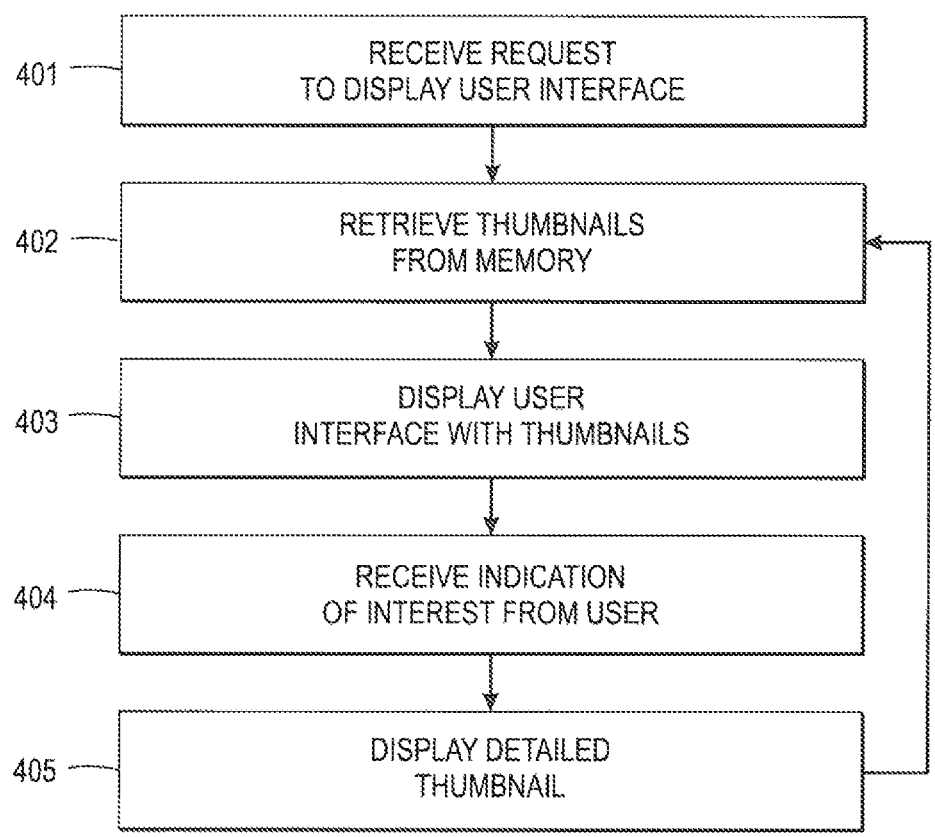
FIG. 4 is a flowchart of a process of displaying preview thumbnails on a user interface, as used in an embodiment.

FIG. 4 is a flowchart of a process of displaying preview thumbnails on a user interface, as used in an embodiment. The process of FIG. 4, which may optionally be included in various embodiments of printer drivers and other systems, enables a user interface to display detailed thumbnails in response to appropriate user interactions with the interface, as generally described previously. The process may be performed by a printer driver displaying a user interface with print options. The process may be performed at block 202 of FIG. 2 and/or at block 309 of FIG. 3, among others. In various embodiments, additional blocks may be included, some blocks may be removed, and/or blocks may be connected or arranged differently from what is shown.

At block 401, the printer driver receives a request to display a user interface. The request may be a user request to print a document, for example. The request may be a selection of a tab on an interface already being displayed, or other selection or interaction that triggers display of a portion of the printer driver user interface that is configured to include preview thumbnails. Other appropriate requests may be contemplated.

At block 402, the printer driver retrieves the appropriate thumbnails from memory, in preparation for displaying them. The thumbnails to be retrieved may have been previously generated at block 307 of FIG. 3, in an embodiment. The process of FIG. 3 or other process of generating the thumbnails may be performed serially prior to block 402, or it may be performed asynchronously, such as in a separate thread, the latter embodiment possibly providing certain performance benefits. In another embodiment, thumbnails are not stored in memory and then retrieved, but rather are presented directly upon generation. At block 403, the printer driver displays a user interface with the retrieved thumbnails.

In an embodiment, it may be desirable for the user interface to present a more detailed thumbnail of a certain print option, such as a larger thumbnail, a higher-resolution thumbnail, a thumbnail presenting a different portion of the document, or the like. Presenting such detailed thumbnails immediately on the user interface may be undesirable for various reasons, such as available user interface space, aesthetic purposes, faster user interface performance, and so on. Accordingly, at block 404, the detailed thumbnail may be presented in response to an indication of interest from the user. The indication of interest may include hovering a mouse cursor over an appropriate portion of the user interface, clicking and/or dragging on a portion of the interface, typing a command, shifting a focus indicator (for example with the Tab key), allowing a period of time to elapse, touching and/or dragging a portion of a touch screen, and the like, as well as combinations of these and other indications. In an embodiment, the indication of interest comprises hovering over and/or clicking on a currently displayed thumbnail, which may provide the advantage of intuitively indicating to the user the association between the non-detailed thumbnail and the detailed thumbnail to be subsequently displayed. The indication of interest may include a selection of a print option, but it need not necessarily be such a selection.

At block 405, a detailed thumbnail is displayed on the user interface. The parameters for generation of the detailed thumbnail may be based on a thumbnail profile and/or settings of the printer driver. Depending on the implementation of the process of generation of thumbnails, the generation of the detailed thumbnail may occur after receipt of the indication of interest at block 404 and/or prior to receipt of the indication, in the latter case the detailed thumbnail image data being cached at the time of generation for later use.

The detailed thumbnail may be positioned at various locations with respect to the user interface, in various embodiments. In an embodiment, the detailed thumbnail is placed near the mouse cursor, in a separate sub-window such as a "tooltip." In an embodiment, the detailed thumbnail is placed in proximity to the related non-detailed thumbnail. For example, the detailed thumbnail may be placed directly over the non-detailed thumbnail to suggest a "zooming" effect; the detailed thumbnail may optionally be animated to augment that suggestion. In an embodiment, the detailed thumbnail is placed in a fixed position, such as in a reserved area on the user interface.

Figure 5:
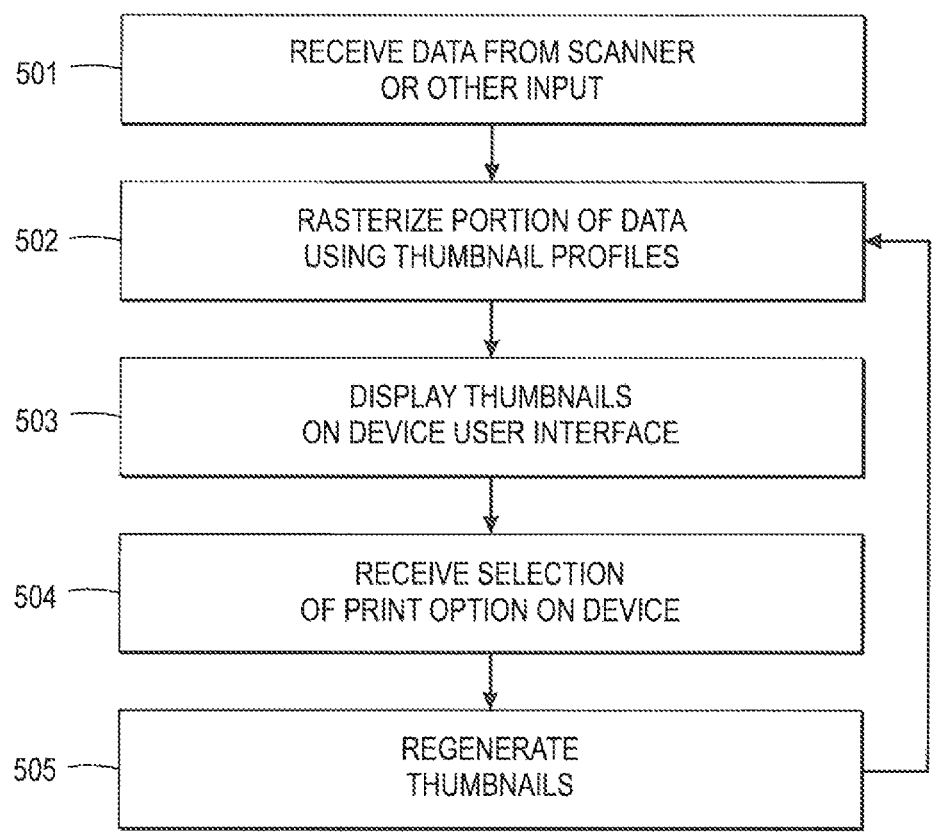
FIG. 5 is a flowchart of a process of presenting a user interface with preview thumbnails on a multifunction device or other device, as used in an embodiment.

FIG. 5 is a flowchart of a process of presenting a user interface with preview thumbnails on a multifunction device or other device, as used in an embodiment. The process is related to that process described with respect to FIG. 2, which related to printer drivers on user computers. In various embodiments, additional blocks may be included, some blocks may be removed, and/or blocks may be connected or arranged differently from what is shown.

At block 501, the device receives data from a scanner or other input. In the case of a multifunction device, the input may be from the device's attached scanner, from a fax interface, from a connected computer, from a network printing client, or the like. The data may be formatted in a page description language or otherwise may indicate that it represents a document to be printed on the device.

At block 502, the device rasterizes a portion of the data using thumbnail profiles available to the device. The process may be similar to block 204 of FIG. 2 and/or the process of FIG. 3. The process may be performed locally on computing hardware of the device and/or delegated to an external computing system, for example through a remote procedure call system.

At block 503, the thumbnails generated at block 502 are presented on a user interface. The user interface may be included in the device itself, as in the case of a multifunction device with an LCD panel or other display. Additionally or alternately, the user interface may be transmitted remotely, as in the case of a web interface. The user interface may include interactive features such as the presentation of detailed thumbnails, using a process similar to that of FIG. 4.

As with the embodiment described in FIG. 2, the device may be optionally configured to regenerate thumbnails in response to a selection of a print option. In accordance with this embodiment, at block 504, a selection of a print option is received at the device. The device then proceeds to regenerate the preview thumbnails at block 505, incorporating the selected option into the generated thumbnails.

Sample User Interfaces

Many different user interface elements may be included for displaying and/or manipulating preview thumbnails according to methods such as those previously described, in various embodiments. Such elements on several sample user interfaces are presented in the following embodiments. It will be understood that individual elements may be used independent of other user interface elements, that user interfaces may be rearranged, and that user interface elements may be added, removed, altered in appearance and/or function, in various embodiments. Although the embodiments presented here relate to user interfaces displayed on a windowed operating system using a mouse and/or keyboard as inputs, it will further be understood that aspects of the user interfaces may be adapted to many different types of systems, such as touch screen systems, embedded hardware systems, networked systems, and the like, with corresponding adaptations as appropriate for the input and output mechanisms of each system.

Figure 6:
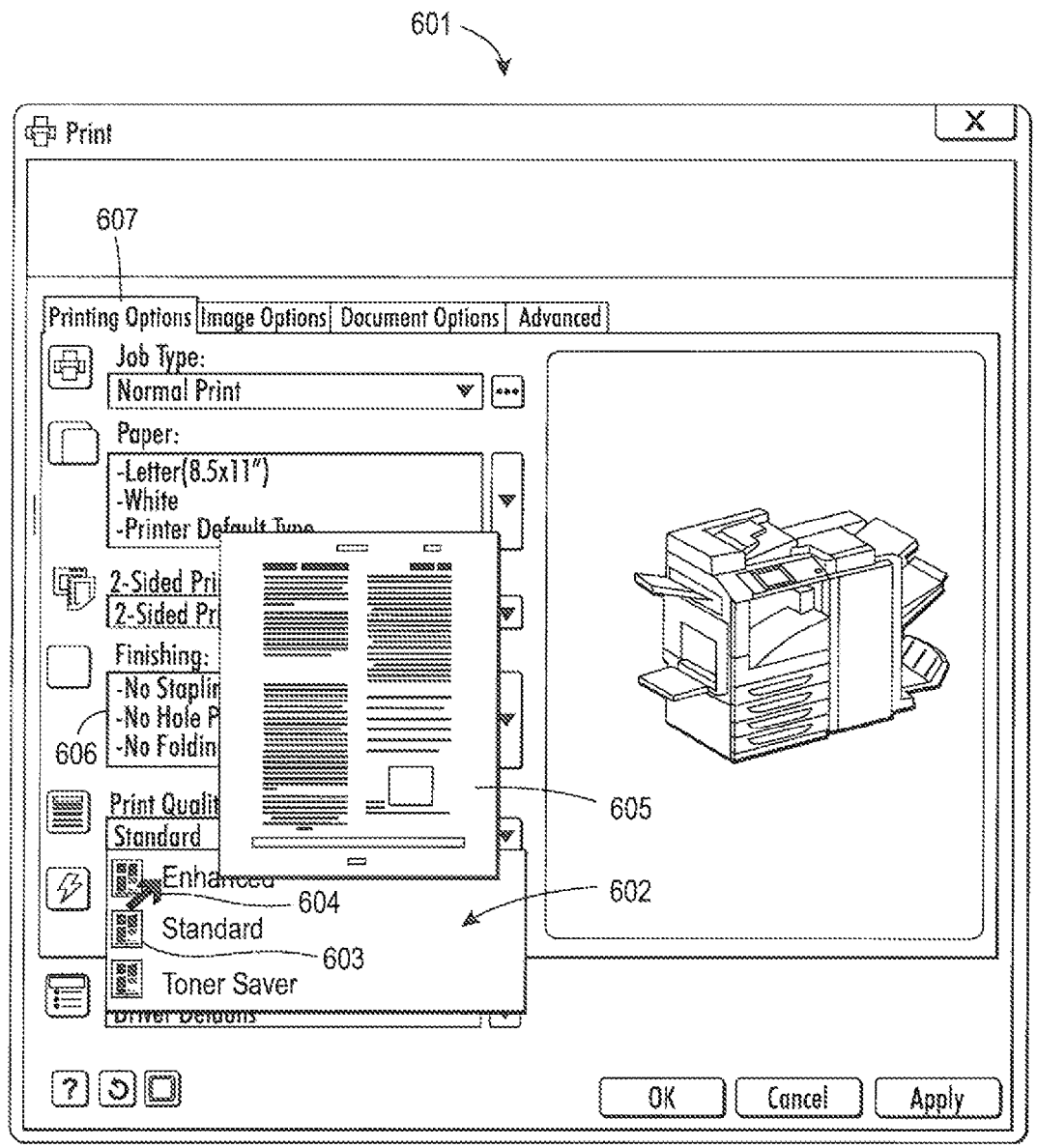
FIG. 6 is a sample user interface showing preview thumbnails and other interface elements including a drop-down box element, as used in an embodiment.

FIG. 6 is a sample user interface showing preview thumbnails and other interface elements including a drop-down box element, as used in an embodiment. The user interface 601 may be displayed by a printer driver operating on a user computer during the process of printing a document, in an embodiment.

User interface 601 may include a drop-down box 602 presenting several options, here relating to print quality. The drop-down box may include several choices for the option, here an enhanced printing setting, a standard printing setting, and a toner saver setting. Adjacent to each option choice is a preview thumbnail 603, which may display the predicted appearance of a page of the document as it would be printed with the corresponding setting selected. For example, if the toner saver setting would generate a lighter print than the other settings (perhaps to save toner), then the corresponding thumbnail would appear lighter than the others, in an embodiment. It will be understood that print options beside print quality may be selected and/or presented in conjunction with thumbnails.

To generate the three thumbnails 603, the print driver may maintain three thumbnail profiles, corresponding to the three print settings shown in drop-down box 602. These thumbnail profiles may be used by the print driver in processes such as block 203 of FIG. 2 and/or block 301 of FIG. 3. Although in various embodiments the user interface may display zero, one, or more thumbnails at a time, embodiments displaying two or more thumbnails simultaneously may have the advantage of enabling the user to make quick visual comparisons of multiple settings for various print options.

Detailed thumbnail 605 may be displayed in response to mouse cursor 604 being placed over one of the settings of drop-down box 602. The detailed thumbnail may have been generated according to a process such as that of FIG. 4. In the embodiment of user interface 601, the detailed thumbnail is an enlargement of the standard thumbnail 603 corresponding to the print quality setting over which mouse cursor 604 is hovered.

As explained with respect to blocks 206-207 of FIG. 2, the selection of print options may trigger regeneration of the preview thumbnails or otherwise affect the appearance of those thumbnails, in some embodiments. As one example, if the finishing option 606 is set by the user to hole punching and stapling, then thumbnails 603 and/or detailed thumbnail 605 may be changed in appearance, such as to include a graphical representation of staples and/or hole punches in the thumbnails. Other selections of print options may have similar effects on the thumbnails.

User interface 601 includes several tabs 607. In an embodiment, when a tab other than the "Printing Options" tab is selected, then some or all of the user interface elements shown in FIG. 6 may be hidden. Thus, in an embodiment, thumbnails 603 and/or 605 may not be generated until "Printing Options" tab 607 is selected. This may be implemented by setting the selection of that tab to be the event triggering preview thumbnail generation as discussed with respect to block 202 of FIG. 2, for example. Along similar lines, in an embodiment, events triggering thumbnail generation may additionally or alternatively include opening of drop-down box 602, hovering of mouse cursor 604, and/or other events.

Figure 7:
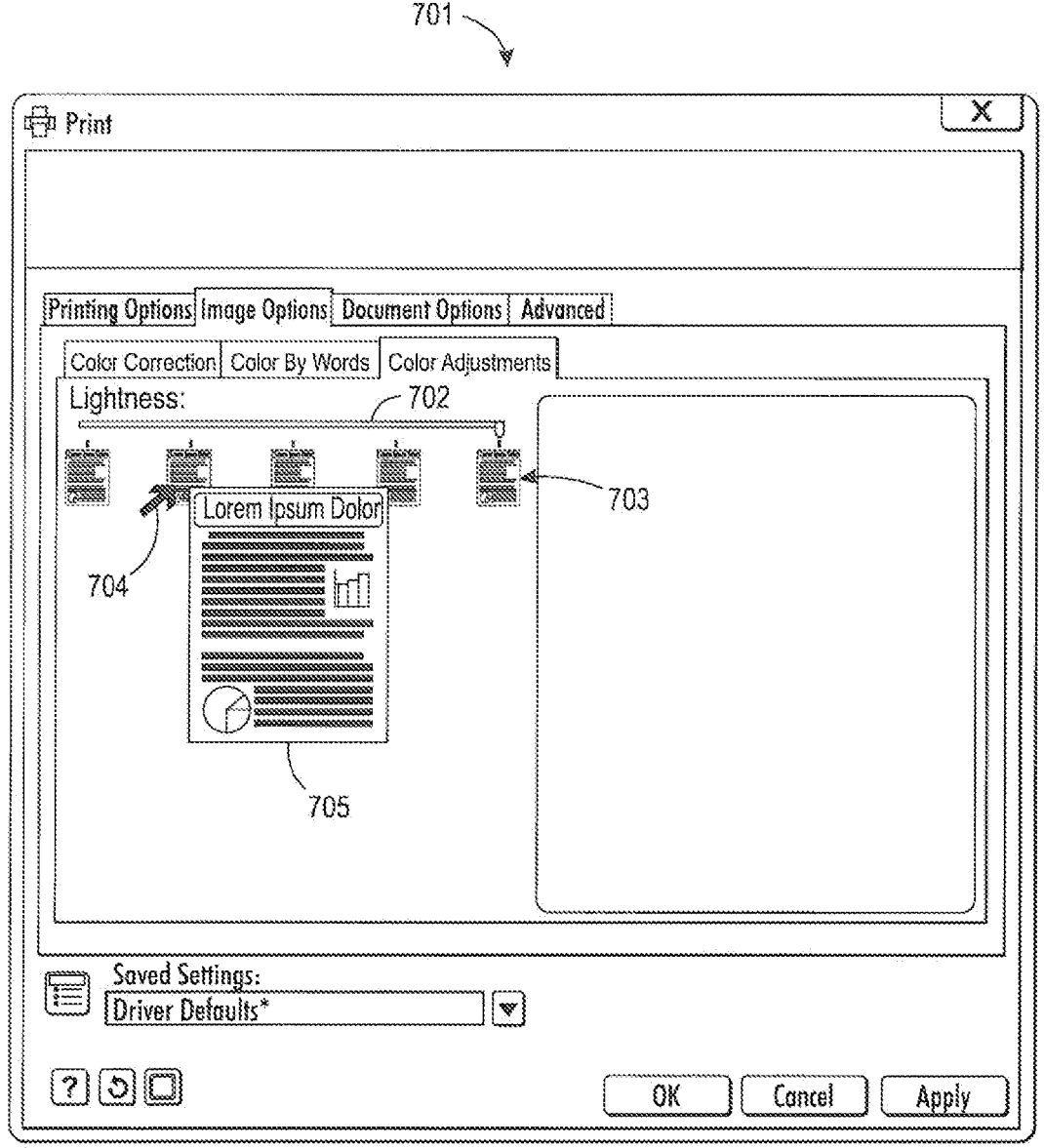
FIG. 7 is a sample user interface including preview thumbnails and a slider element, as used in an embodiment.

FIG. 7 is a sample user interface including preview thumbnails and a slider element, as used in an embodiment. The user interface 701 may be displayed by a printer driver operating on a user computer during the process of printing a document, in an embodiment.

User interface 701 may include a slider bar element 702 enabling a user to select among different values for an option. In the particular interface being shown in FIG. 7, the slider selects among settings for the print option of lightness. Preview thumbnails 703 may be placed in proximity to slider 702, to indicate the predicted print appearance with the option at various settings. Thus, in the particular embodiment shown, the thumbnails 703 display the document at varying levels of brightness. In an embodiment, one preview thumbnail is displayed for each possible setting of the print option. In alternate embodiments, more or fewer thumbnails may be displayed for each possible setting. For example, the lightness slider bar 702 could be implemented to allow the user to select among more than five possible lightness settings, even though only five preview thumbnails are shown.

In an embodiment, when mouse cursor 704 is hovered over appropriate sections of interface 701, detailed preview 705 may be shown. For example, detailed thumbnail 705 may be shown upon mouse cursor 704 being hovered over one of thumbnails 703. Additionally or alternatively, a detailed preview thumbnail may be shown in response to interaction with slider 702. For example, slider 702 may be implemented to display a continuously updating preview thumbnail while a user drags slider 702 across the range of possible values.

Figure 8:
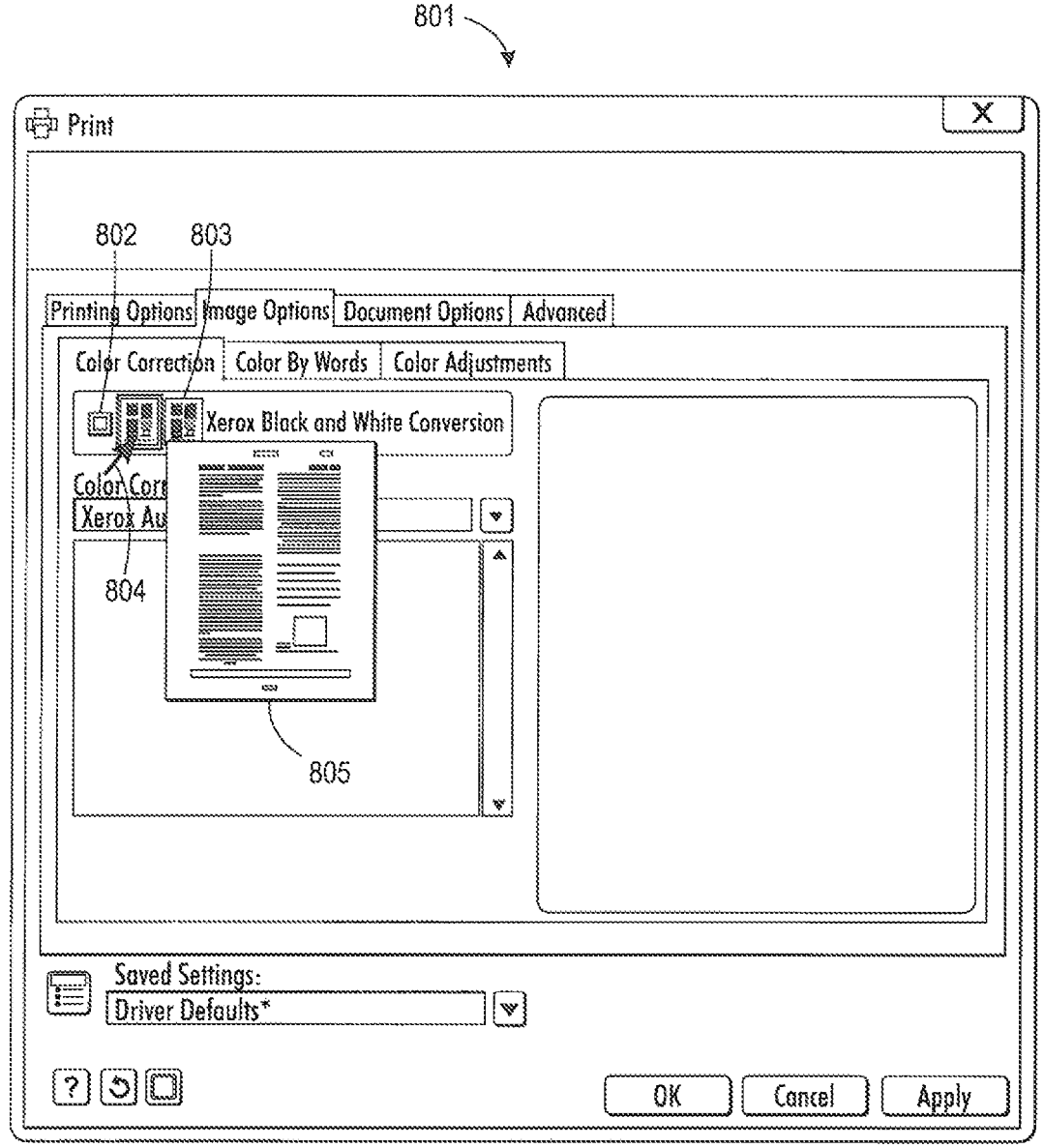
FIG. 8 is a sample user interface including preview thumbnails and a check box element, as used in an embodiment.

FIG. 8 is a sample user interface including preview thumbnails and a check box element, as used in an embodiment. The user interface 801 may be displayed by a printer driver operating on a user computer during the process of printing a document, in an embodiment.

User interface 801 includes check box element 802 which may be selected or deselected by a user. Associated with the check box element are preview thumbnails 803, which may display the predicted appearance of the document when the check box is selected or not selected. In further embodiments, other user interface elements such as radio buttons may similarly be used and associated with preview thumbnails.

Among the preview thumbnails 803, the thumbnail corresponding for the state of check box 802 is highlighted, for example by drawing a box around it. In an embodiment, when the user changes the state of check box 802, the highlighting around thumbnails 803 is automatically updated. In an embodiment, thumbnails 803 are configured to be responsive, so that when a thumbnail is selected (for example, by clicking), the state of the corresponding check box 802 is updated appropriately.

Detailed thumbnail 805 may be displayed in response to an appropriate action by mouse cursor 804. For example, when the mouse cursor hovers over one of thumbnails 803, a corresponding detailed thumbnail 805 may be displayed. Additionally or alternatively, detailed thumbnail 805 may appear in response to a user selection of check box 802. In this embodiment as with other embodiments of detailed thumbnails, detailed thumbnail 805 may be configured to only appear for a limited amount of time and/or to disappear in response to a further user action.

Example Computer System

Figure 9:
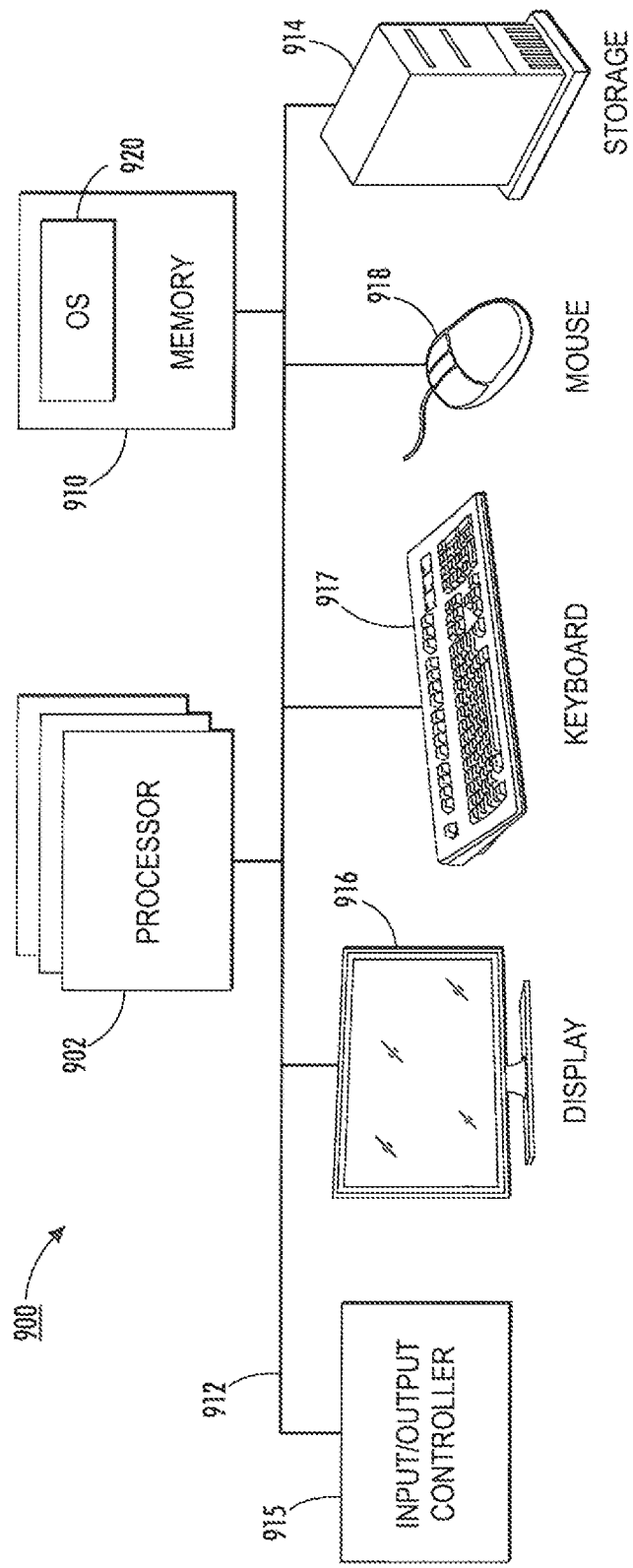
FIG. 9 illustrates a computer system 900 that is consistent with embodiments of the present teachings.

FIG. 9 illustrates a computer system 900 that is consistent with embodiments of the present teachings. In general, embodiments of a printer driver (e.g., printer drivers 130 and 180) in the printing system may be implemented in various computer systems, such as a personal computer, a server, a workstation, an embedded system, or a combination thereof, for example, computer system 900. Certain embodiments of the P2P module may be embedded as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. However, for purposes of explanation, system 900 is shown as a general purpose computer that is well known to those skilled in the art. Examples of the components that may be included in system 900 will now be described.

As shown, system 900 may include at least one processor 902, a keyboard 917, a pointing device 918 (e.g., a mouse, a touchpad, and the like), a display 916, main memory 910, an input/output controller 915, and a storage device 914. Storage device 914 can comprise, for example, RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. A copy of the computer program embodiment of the printing system can be stored on, for example, storage device 914. System 900 may also be provided with additional input/output devices, such as a printer (not shown). The various components of system 900 communicate through a system bus 912 or similar architecture. In addition, system 900 may include an operating system (OS) 920 that resides in memory 910 during operation. One skilled in the art will recognize that system 900 may include multiple processors 902. For example, system 900 may include multiple copies of the same processor. Alternatively, system 900 may include a heterogeneous mix of various types of processors. For example, system 900 may use one processor as a primary processor and other processors as co-processors. For another example, system 900 may include one or more multi-core processors and one or more single core processors. Thus, system 900 may include any number of execution cores across a set of processors (e.g., processor 902). As to keyboard 917, pointing device 918, and display 916, these components may be implemented using components that are well known to those skilled in the art. One skilled in the art will also recognize that other components and peripherals may be included in system 900.

Main memory 910 serves as a primary storage area of system 900 and holds data that is actively used by applications, such as the printer driver of the printing system, running on processor 902. One skilled in the art will recognize that applications are software programs that each contains a set of computer instructions for instructing system 900 to perform a set of specific tasks during runtime, and that the term "applications" may be used interchangeably with application software, application programs, and/or programs in accordance with embodiments of the present teachings. Memory 910 may be implemented as a random access memory or other forms of memory as described below, which are well known to those skilled in the art.

OS 920 is an integrated collection of routines and instructions that are responsible for the direct control and management of hardware in system 900 and system operations. Additionally, OS 920 provides a foundation upon which to run application software. For example, OS 920 may perform services, such as resource allocation, scheduling, input/output control, and memory management. OS 920 may be predominantly software, but may also contain partial or complete hardware implementations and firmware. Well known examples of operating systems that are consistent with the principles of the present teachings include MICROSOFT WINDOWS (e.g., WINDOWS CE, WINDOWS NT, WINDOWS 2000, WINDOWS XP, and WINDOWS VISTA), MAC OS, LINUX, UNIX, ORACLE SOLARIS, OPEN VMS, and IBM AIX.

The foregoing description is illustrative, and variations in configuration and implementation may occur to persons skilled in the art. For instance, the various illustrative logics, logical blocks, modules, and circuits described in connection with the embodiments disclosed herein may be implemented or performed with a general purpose processor (e.g., processor 902), a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

If implemented in software, the functions may be stored on or transmitted over a computer-readable medium as one or more instructions or code. Computer-readable media includes both tangible computer storage media and communication media including any medium that facilitates transfer of a computer program from one place to another. A storage media may be any available tangible media that can be accessed by a computer. By way of example, and not limitation, such tangible computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media. Resources described as singular or integrated can in one embodiment be plural or distributed, and resources described as multiple or distributed can in embodiments be combined. The scope of the present teachings is accordingly intended to be limited only by the following claims.

Other embodiments will be apparent to those skilled in the art from consideration of the specification and practice of the embodiments disclosed herein. It is intended that the specification and examples be considered as exemplary only.

What is claimed is:

1. A method of presenting options for printing a document, the method being performed on a computing system comprising a computer processor and non-transitory storage, the method comprising:
   receiving data descriptive of a document to be printed;
   identifying preview thumbnail profiles indicative of graphical parameters for rendering a portion of the document to be printed into preview thumbnail images;
   rendering a portion of the document to be printed, based at least in part on the graphical parameters of the preview thumbnail profiles, to generate preview thumbnail images of the portion of the document to be printed, wherein the preview thumbnail images are based on one or more settings of a display device on which the preview thumbnail images will be presented thereby increasing fidelity between the preview thumbnail images and a printed output; and
   displaying the preview thumbnail images on a printer driver user interface in conjunction with one or more printing options, whereby:

the preview thumbnail images display predicted appearances of the portion of the document corresponding to the one or more printing options; and the print driver user interface displays two or more preview thumbnail images simultaneously.

2. The method of claim 1, further comprising transmitting data to a printer, directing the printer to print the document to be printed, the transmitted data indicating user selections of the one or more printing options.

3. The method of claim 1, further comprising:
receiving, from a user, a selection of settings for one of the one or more printing options; and
regenerating at least one of the preview thumbnail images based on the selection of settings, whereby the regenerated preview thumbnail images incorporate the selection of settings.

4. The method of claim 1, further comprising determining whether to display preview thumbnail images or stock thumbnail images on the printer driver user interface, wherein the portion of the document to be printed is rendered to generate the preview thumbnail images in response to a determination to display preview thumbnail images rather than stock thumbnail images.

5. The method of claim 1, further comprising:
receiving, on the printer driver user interface, an indication of interest in a portion of the user interface;
identifying a detailed preview thumbnail image corresponding to the portion of the user interface in which interest was indicated; and
displaying the detailed preview thumbnail image on the user interface.

6. The method of claim 5, wherein the indication of interest comprises hovering a mouse cursor over the portion of the user interface.

7. The method of claim 5, wherein the detailed preview thumbnail image comprises a larger version of one of the preview thumbnail images being displayed on the user interface.

8. The method of claim 1, wherein the computing system is a multifunction device, and wherein the user interface comprises a display and one or more buttons on the multifunction device.

9. The method of claim 1, wherein displaying the preview thumbnail images comprises:
determining at least one display setting of the computing system or a display of the computing system; and
displaying the preview thumbnail in a manner that adjusts the preview thumbnail images to account for the at least one display setting.

10. A computer system comprising:
one or more computer processors configured to execute software modules stored in memory;
a non-transitory memory having stored therein a plurality of software modules;
a document receipt module stored in the memory configured to receive data descriptive of a document to be printed;
a rendering module stored in the memory configured to render a portion of the document to be printed, based at least in part on the graphical parameters of the preview thumbnail profiles, to generate preview thumbnail images of the portion of the document to be printed, wherein the preview thumbnail images are based on one or more settings of a display device on which the preview thumbnail images will be presented thereby increasing fidelity between the preview thumbnail images and a printed output; and a display module stored in the memory configured to display the preview thumbnail images on a printer driver user interface in conjunction with one or more printing options, whereby:
the preview thumbnail images display predicted appearances of the portion of the document corresponding to the one or more printing options; and
the print driver user interface displays two or more preview thumbnail images simultaneously.

11. The computer system of claim 10, further comprising a transmission module stored in the memory configured to transmit data to a printer, the data directing the printer to print the document to be printed, the transmitted data indicating user selections of the one or more printing options.

12. The computer system of claim 10, further comprising:
a settings receipt module stored in the memory configured to receive, from a user, a selection of settings for one of the one or more printing options; and
a regeneration module stored in the memory configured to regenerate at least one of the preview thumbnail images based on the selection of settings, whereby the regenerated preview thumbnail images incorporate the selection of settings.

13. The computer system of claim 10, further comprising a stock image use module configured to determine whether to display preview thumbnail images or stock thumbnail images on the printer driver user interface, wherein the portion of the document to be printed is rendered to generate the preview thumbnail images in response to a determination to display preview thumbnail images rather than stock thumbnail images.

14. The computer system of claim 10, further comprising:
an interest indication module stored in the memory configured to receive, on the printer driver user interface, an indication of interest in a portion of the user interface;
an identification module stored in the memory configured to identify a detailed preview thumbnail image corresponding to the portion of the user interface in which interest was indicated; and
a detailed display module stored in the memory configured to display the detailed preview thumbnail image on the user interface.

15. The computer system of claim 14, wherein the indication of interest comprises hovering a mouse cursor over the portion of the user interface.

16. The computer system of claim 14, wherein the detailed preview thumbnail image comprises a larger version of one of the preview thumbnail images being displayed on the user interface.

17. The computer system of claim 10, wherein the computing system is a multifunction device, and wherein the user interface comprises a display and one or more buttons on the multifunction device.

18. The computer system of claim 10, wherein displaying the preview thumbnail images comprises:
determining at least one display setting of the computing system or a display of the computing system; and
displaying the preview thumbnail in a manner that adjusts the preview thumbnail images to account for the at least one display setting.

19. A non-transitory computer-readable medium having stored thereon a plurality of instructions configured to be executed on a computer system comprising a computer processor, the plurality of instructions comprising:

a document receipt module configured to receive data descriptive of a document to be printed;

a rendering module configured to render a portion of the document to be printed, based at least in part on the graphical parameters of the preview thumbnail profiles, to generate preview thumbnail images of the portion of the document to be printed, wherein the preview thumbnail images are based on one or more settings of a display device on which the preview thumbnail images will be presented thereby increasing fidelity between the preview thumbnail images and a printed output; and a display module configured to display the preview thumbnail images on a printer driver user interface in conjunction with one or more printing options, whereby:

the preview thumbnail images display predicted appearances of the portion of the document corresponding to the one or more printing options; and the print driver user interface displays two or more preview thumbnail images simultaneously.

20. The non-transitory computer-readable medium of claim 19, the plurality of instructions further comprising:

an interest indication module configured to receive, on the printer driver user interface, an indication of interest in a portion of the user interface;

an identification module configured to identify a detailed preview thumbnail image corresponding to the portion of the user interface in which interest was indicated; and a detailed display module configured to display the detailed preview thumbnail image on the user interface.

* * * * *